(12) United States Patent
Bannai et al.

(10) Patent No.: US 12,689,084 B2
(45) Date of Patent: Jul. 21, 2026

(54) BATTERY PACK

(71) Applicant: MURATA MANUFACTURING CO., LTD., Kyoto (JP)

(72) Inventors: Yoshiyuki Bannai, Kyoto (JP); Junichi Ikeda, Kyoto (JP); Hiroshi Kawamura, Kyoto (JP); Ryota Miyajima, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 572 days.

(21) Appl. No.: 18/208,618

(22) Filed: Jun. 12, 2023

(65) Prior Publication Data

US 2023/0420776 A1 Dec. 28, 2023

(30) Foreign Application Priority Data

Jun. 27, 2022 (JP) ................................. 2022-102961
Aug. 23, 2022 (JP) ................................. 2022-132591

(51) Int. Cl.
| | |
|---|---|
| *H01M 50/213* | (2021.01) |
| *H01M 50/152* | (2021.01) |
| *H01M 50/559* | (2021.01) |

(52) U.S. Cl.
CPC ....... *H01M 50/213* (2021.01); *H01M 50/152* (2021.01); *H01M 50/559* (2021.01)

(58) Field of Classification Search
CPC . H01M 50/213; H01M 50/559; H01M 50/152
See application file for complete search history.

(56) References Cited

U.S. PATENT DOCUMENTS 5,578,392 A * 11/1996 Kawamura ......... H01M 50/213
429/178
2020/0313129 A1* 10/2020 Koutari ............. H01M 50/3425

FOREIGN PATENT DOCUMENTS

JP 2017195206 A 10/2017

* cited by examiner

*Primary Examiner* — Olatunji A Godo
(74) *Attorney, Agent, or Firm* — K&L Gates LLP

(57) ABSTRACT

A battery pack is provided and includes two or more secondary batteries having a cylindrical shape and arranged in parallel, and a first lead plate that electrically connects two or more of the secondary batteries. The first lead plate includes a first through hole, and a first wall portion provided on a plate surface on the opposite side to a plate surface having a connection surface connected to a terminal of the secondary battery, and the first wall portion has a first wall surface continuous with an inner peripheral surface of the first through hole.

12 Claims, 10 Drawing Sheets

70(43)

BATTERY PACK

CROSS REFERENCE TO RELATED APPLICATIONS

The present application claims priority to Japanese patent application no. JP2022-102961, filed on Jun. 27, 2022, and Japanese patent application no. JP2022-132591, filed on Aug. 23, 2022, the entire contents of which are incorporated herein by reference.

BACKGROUND

The present disclosure relates to a battery pack.

A secondary battery having a cleavage valve is described, where the cleavage valve is cleaved by increase in internal pressure of the secondary battery due to a short circuit inside the secondary battery, heating from the outside of the secondary battery, and the like, and becomes in an open state. When the cleavage valve becomes in an open state, gas or the like is ejected, and internal pressure of the secondary battery decreases.

SUMMARY

In a battery pack having a plurality of secondary batteries, when a cleavage valve of one secondary battery becomes in an open state, gas ejected from the cleavage valve may blow to another secondary battery, and internal pressure of the another secondary battery may increase.

The present disclosure relates to, for example, preventing gas ejected from one secondary battery from being blown to another secondary battery in a battery pack including a plurality of secondary batteries.

A battery pack of the present disclosure, in an embodiment, includes two or more secondary batteries having a cylindrical shape and arranged in parallel, and a lead plate that electrically connects two or more of the secondary batteries. The lead plate includes a first through hole, and a first wall portion provided on a plate surface on the opposite side to a plate surface having a connection surface connected to a terminal of the secondary battery, and the first wall portion has a first wall surface continuous with an inner peripheral surface of the first through hole.

According to the present disclosure, gas ejected from one secondary battery can be prevented from being blown to another secondary battery in a battery pack including a plurality of secondary batteries according to an embodiment.

DETAILED DESCRIPTION

The present disclosure will be described in further detail including with reference to the drawings according to one or more embodiments. Note that the present disclosure is not limited thereto. Each embodiment is illustrative, and it is contemplated that replacement and combination of a part of configurations shown in the different embodiments can be performed.

Figure 1:
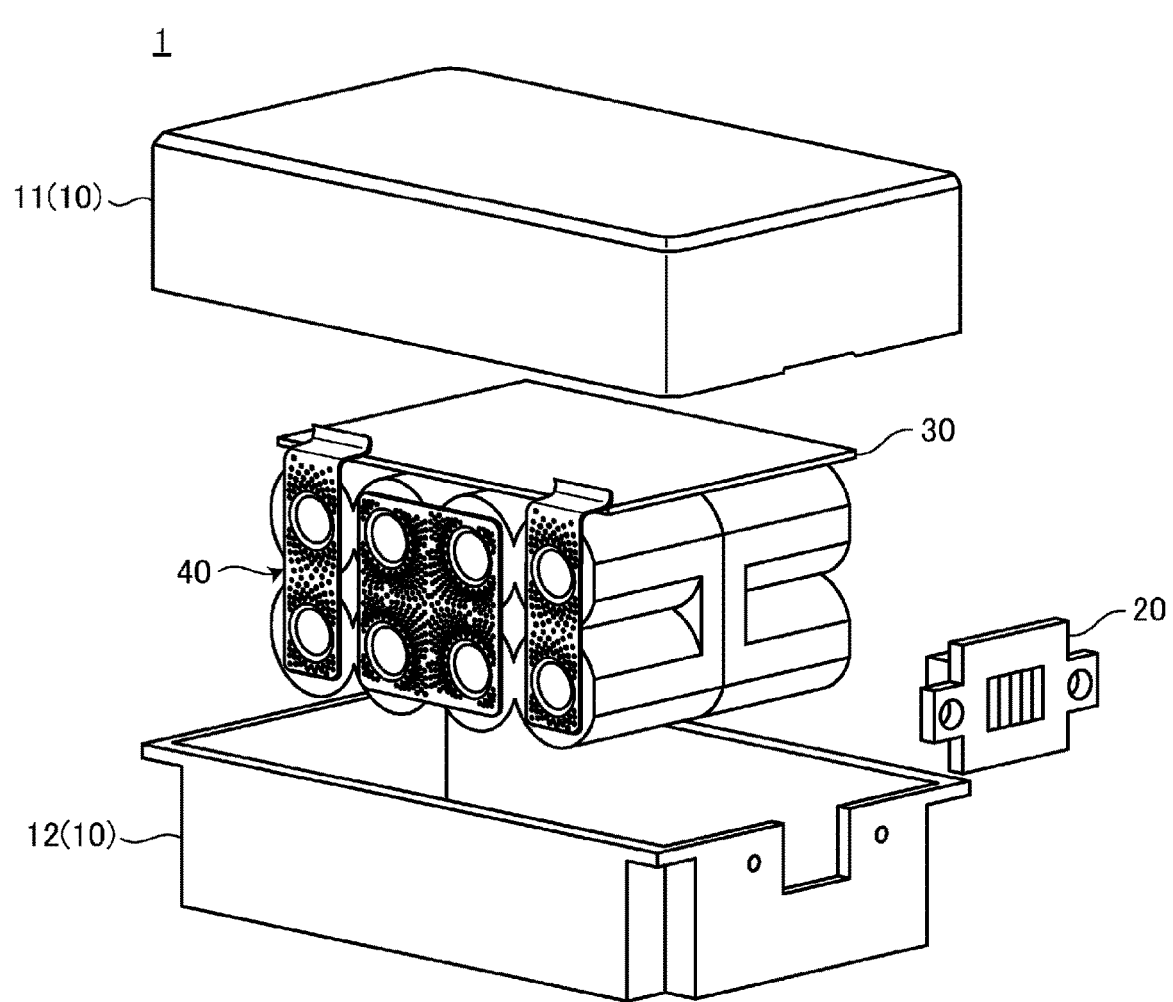
FIG. 1 is an exploded perspective view of a battery pack according to an embodiment of the present disclosure.

FIG. 1 is an exploded perspective view of a battery pack 1 according to an embodiment of the present disclosure. The battery pack 1 can be applied as a power source to an external device (not illustrated) such as an electronic device, an electric vehicle, and an electric tool. The battery pack 1 includes an exterior case 10, a connector 20, a control board and a battery unit 40.

The exterior case 10 has a box shape and houses the control board 30 and the battery unit 40. The exterior case 10 includes a first case portion 11 and a second case portion 12.

The connector 20 is attached to the exterior case 10. The connector 20 electrically connects an external device and the battery unit 40 via the control board 30, and supplies (discharges) power of the battery unit 40 to the external device. Further, the connector 20 electrically connects a power supply (for example, a commercial power supply) and the battery unit 40 via the control board 30, and supplies (charges) power from the power supply to the battery unit 40. The control board controls charging and discharging of the battery unit 40.

Figure 2:
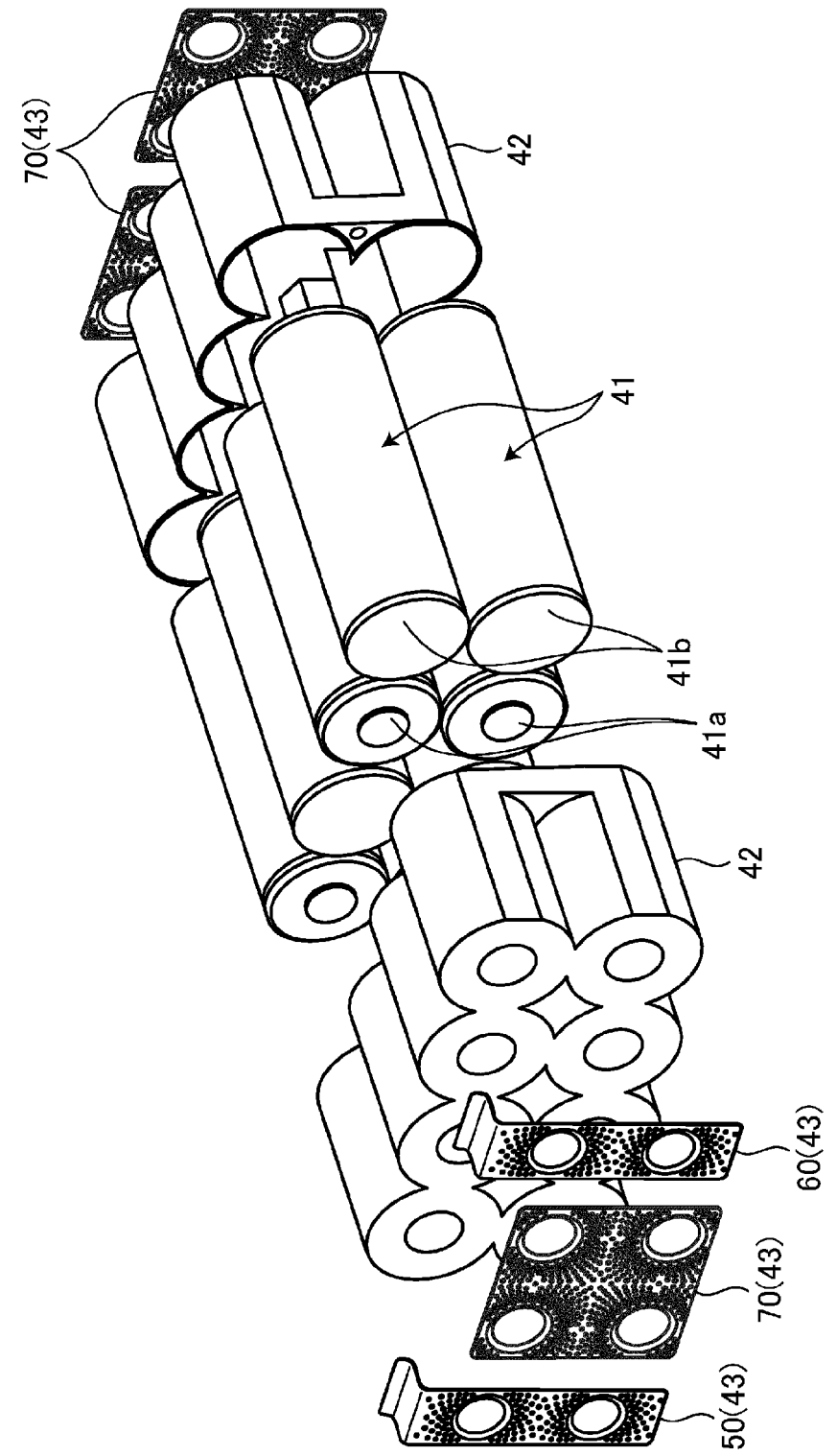
FIG. 2 is an exploded perspective view of a battery unit.

FIG. 2 is an exploded perspective view of the battery unit 40. The battery unit 40 includes a plurality of secondary batteries 41, a holder 42, and a plurality of lead plates 43.

The secondary battery 41 is, for example, a lithium ion battery. The secondary battery 41 has a cylindrical shape. In an embodiment, the number of the secondary batteries 41 is eight, but it is needless to say that the number is not limited to this.

A plurality of the secondary batteries 41 are arranged in parallel. That is, axes of a plurality of the secondary batteries 41 are substantially parallel to each other. Further, in a plurality of the secondary batteries 41, a direction of a positive electrode terminal 41a and a direction of a negative electrode terminal 41b are arranged in a predetermined direction.

Figure 3:
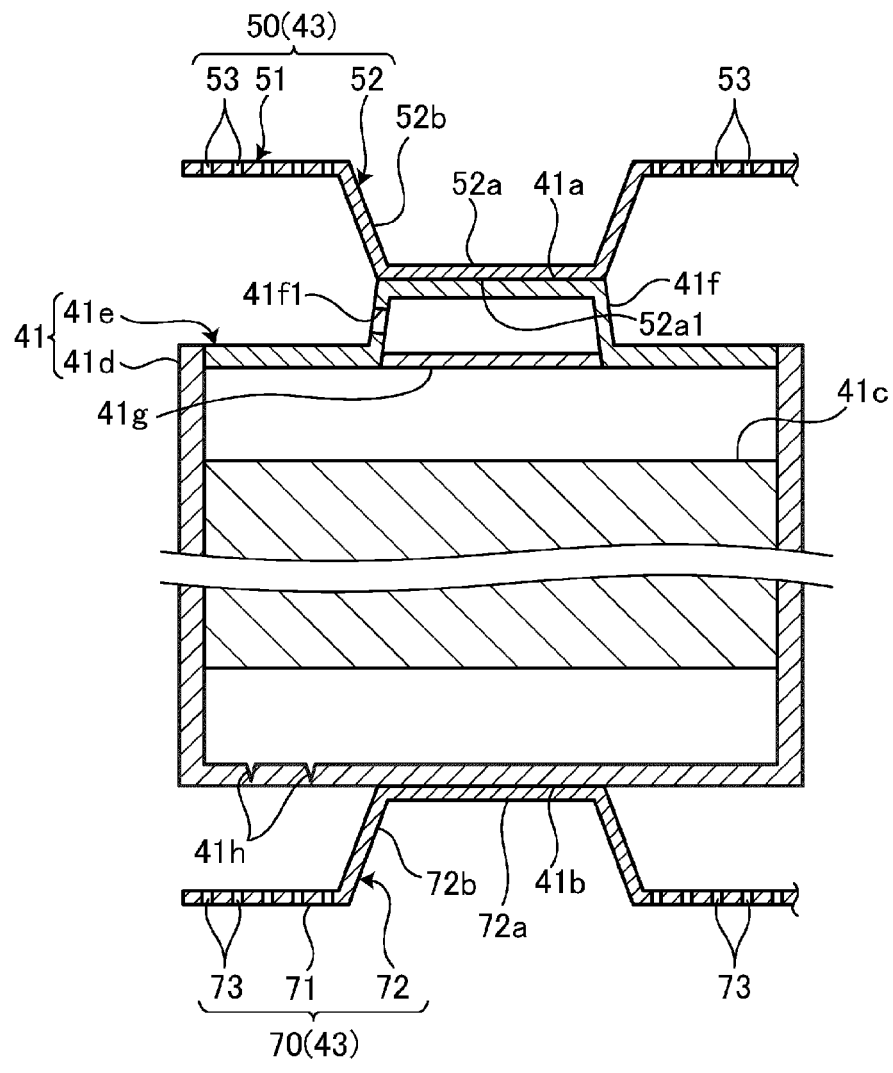
FIG. 3 is a longitudinal sectional view of a secondary battery and a lead plate in the battery unit.

FIG. 3 is a longitudinal sectional view of the secondary battery 41 and the lead plate 43 in the battery unit 40. In FIG. 3, the holder 42 is not illustrated. The secondary battery 41 includes an electrode assembly 41c, a can 41d, and a lid 41e. The can 41d and the lid 41e are made from, for example, iron, SUS, or aluminum, and have conductivity.

The electrode assembly 41c is formed by laminating and winding a plurality of sheet-like positive electrodes (not illustrated) and a plurality of sheet-like negative electrodes (not illustrated) with a separator (not illustrated) interposed therebetween.

The can 41d has a tubular shape having an opening on one end side. The can 41d is electrically connected to a negative electrode of the electrode assembly 41c with current collecting foil (not illustrated) interposed therebetween. A central portion of an end surface on the other end side of the can 41d is a negative electrode terminal 41b of the secondary battery 41.

The lid 41*e* has a plate shape and covers an opening of the can 41*d*. The lid 41*e* is electrically connected to a positive electrode of the electrode assembly 41*c* with current collecting foil interposed therebetween. The lid 41*e* and the can 41*d* are electrically insulated by an insulating member (not illustrated).

The lid 41*e* has a protrusion 41*f* and a cleavage valve 41*g*. The protrusion 41*f* is located at the center of the lid 41*e*. A protruding end surface of the protrusion 41*f* is the positive electrode terminal 41*a* of the secondary battery 41. Further, a hole 41*f*1 that allows the inside and the outside of the secondary battery 41 to communicate with each other is provided on a side wall of the protrusion 41*f*. Note that a plurality of the holes 41*f*1 may be provided.

The cleavage valve 41*g* is arranged inside the protrusion 41*f* inside the secondary battery 41. Specifically, the cleavage valve 41*g* is arranged at a position that partitions a space communicating with the hole 41*f*1 and a space where the electrode assembly 41*c* is located. When an internal pressure of the secondary battery 41 reaches or exceeds a predetermined value, the cleavage valve 41*g* is cleaved to be in an open state.

Further, a thin portion 41*h* is provided on a side wall on the other end side of the can 41*d*. The thin portion 41*h* is a portion having a small thickness on a side wall on the other end side of the can 41*d*. A side wall on the other end side of the can 41*d* is cleaved from the thin portion 41*h* when an internal pressure of the secondary battery 41 becomes high. For example, in a case where the cleavage valve 41*g* is not in an open state when an internal pressure of the secondary battery 41 becomes a predetermined value or more, when the internal pressure of the secondary battery 41 further increases, a side wall on the other end side of the can 41*d* is cleaved from the thin portion 41*h*.

The holder 42 holds a plurality of the secondary batteries 41. The holder 42 mainly holds a peripheral side surface of the secondary battery 41. The holder 42 holds a portion of the secondary battery 41 other than a portion of the can 41*d* provided with the positive electrode terminal 41*a*, the negative electrode terminal 41*b*, the protrusion 41*f*, and the thin portion 41*h*.

The lead plate 43 electrically connects a plurality of the secondary batteries 41. As illustrated in FIG. 2, the lead plate 43 includes a first lead plate 50, a second lead plate 60, and a third lead plate 70. The first lead plate 50 and the second lead plate 60 have the same shape and electrically connect two of the secondary batteries 41. The third lead plate 70 electrically connects four of the secondary batteries 41. It goes without saying that the number of the secondary batteries 41 electrically connected by each of the first lead plate 50, the second lead plate 60, and the third lead plate 70 is not limited to the above numbers.

The first lead plate 50, the second lead plate 60, and third lead plate 70 are made from metal having a substantially constant thickness, and are formed by press working.

Next, the first lead plate 50 will be described. Note that description of the second lead plate 60 having the same shape as the first lead plate 50 is omitted.

Figure 4:
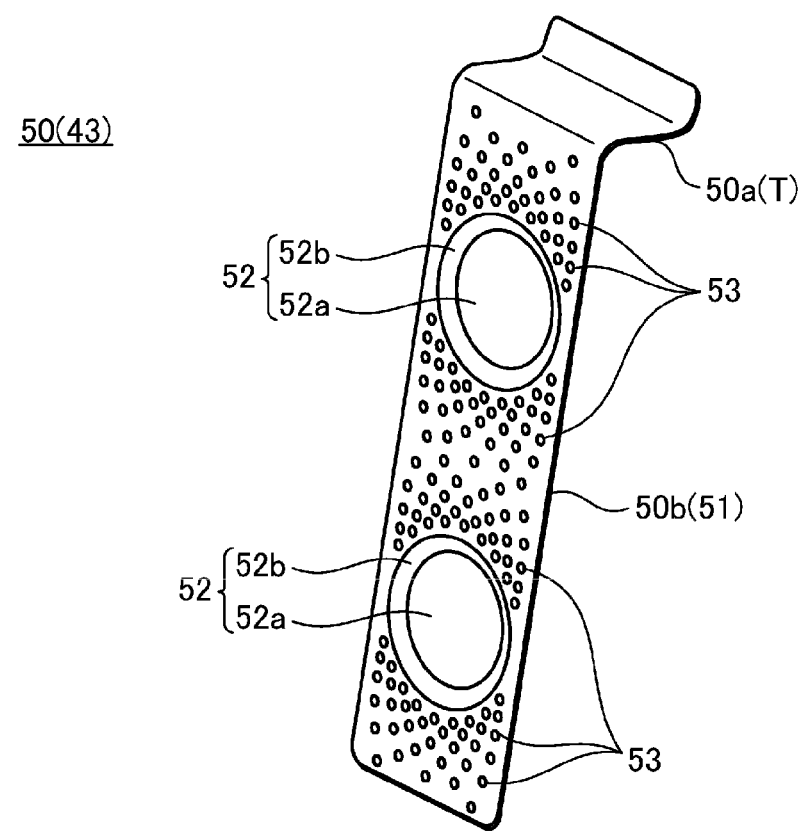
FIG. 4 is a perspective view of a first lead plate.

FIG. 4 is a perspective view of the first lead plate 50. The first lead plate 50 has an L-shaped section. A first piece 50*a* of the first lead plate 50 is a connection terminal T electrically connected to the connector 20 with the control board 30 interposed therebetween. Between the connection terminal T of each of the first lead plate 50 and the second lead plate 60, a plurality of the secondary batteries 41 are electrically connected in series or in parallel with the first lead plate 50, the second lead plate 60, and the third lead plate 70 interposed therebetween.

A second piece 50*b* of the first lead plate 50 has a main plate portion 51, two recesses 52, and a plurality of first through holes 53. The main plate portion 51 and two of the recesses 52 are continuous and integrated.

The main plate portion 51 has a flat plate shape and a rectangular shape in a plan view. As illustrated in FIG. 3, the main plate portion 51 is arranged substantially parallel to an end surface of the secondary battery 41.

The recess 52 is recessed toward the positive electrode terminal 41*a* side or the negative electrode terminal 41*b* side. The recess 52 has a circular shape in a plan view. The recess 52 has a bottom wall portion 52*a* and an inclined wall portion 52*b*.

The bottom wall portion 52*a* has a connection surface 52*a*1 electrically connected to one of the positive electrode terminal 41*a* and the negative electrode terminal 41*b* of the secondary battery 41 on a bottom surface. One of the positive electrode terminal 41*a* and the negative electrode terminal 41*b* and the connection surface 52*a*1 are electrically connected by resistance welding. The bottom wall portion 52*a* has a circular shape in a plan view.

The inclined wall portion 52*b* is provided around the bottom wall portion 52*a* and connects the bottom wall portion 52*a* and the main plate portion 51. In the inclined wall portion 52*b*, an end on the main plate portion 51 side is positioned further on the outer side than an end on the bottom wall portion 52*a* side in a plan view in which the battery unit 40 is viewed from one of the positive electrode terminal 41*a* and the negative electrode terminal 41*b*. That is, the inclined wall portion 52*b* is inclined with a gradient in which the diameter decreases from the main plate portion 51 side toward the bottom wall portion 52*a* side.

As illustrated in FIG. 3, in a case where the bottom wall portion 52*a* is connected to the positive electrode terminal 41*a*, the main plate portion 51 is located at a position away from the positive electrode terminal 41*a* and the hole 41*f*1 due to the presence of the recess 52. On the other hand, in a case where the bottom wall portion 52*a* is connected to the negative electrode terminal 41*b*, the main plate portion 51 is located at a position away from a portion of the can 41*d* where the negative electrode terminal 41*b* and the thin portion 41*h* are provided.

A plurality of the first through holes 53 are arranged in the main plate portion 51 and penetrate the main plate portion 51. The first through hole 53 is not arranged in the recess 52.

Figure 5:
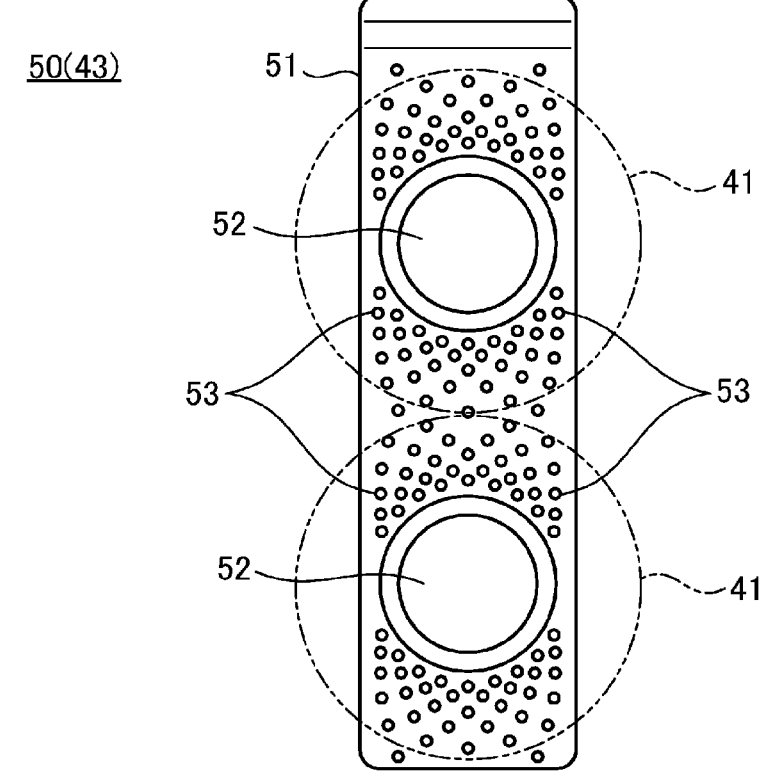
FIG. 5 is a plan view of the first lead plate.

FIG. 5 is a plan view of the first lead plate 50. A part of a plurality of the first through holes 53 is in a portion where the secondary battery 41 and the main plate portion 51 overlap with each other in a plan view in which the battery unit 40 is viewed from one of the positive electrode terminal 41*a* and the negative electrode terminal 41*b*. By the above, the main plate portion 51 around the recess 52 faces an end surface of the secondary battery 41. Further, in a case where a portion of the can 41*d* provided with the thin portion 41*h* and the main plate portion 51 face each other, a part of a plurality of the first through holes 53 faces the portion of the can 41*d* provided with the thin portion 41*h*.

Further, another part of a plurality of the first through holes 53 is in a portion other than a portion overlapping the secondary battery 41 in a plan view in which the battery unit 40 is viewed from one of the positive electrode terminal 41*a* and the negative electrode terminal 41*b*. Note that the first through hole 53 may be in one of a portion overlapping the secondary battery 41 and a portion other than the portion overlapping the secondary battery 41 in a plan view of the battery unit 40 viewed from one of the positive electrode terminal 41*a* and the negative electrode terminal 41*b*. Note that the first through hole 53 is not arranged in the first piece 50*a* of the first lead plate 50 constituting the connection terminal T.

Furthermore, in a plan view of the main plate portion 51, the number of the first through holes 53 per unit area increases toward the recess 52. Specifically, a plurality of the first through holes 53 are radially arranged about a central portion of the recess 52 in a plan view. That is, a plurality of the first through holes 53 are arranged radially around the positive electrode terminal 41*a* or the negative electrode terminal 41*b* in a plan view in which the battery unit 40 is viewed from one of the positive electrode terminal 41*a* and the negative electrode terminal 41*b*.

Figure 6:
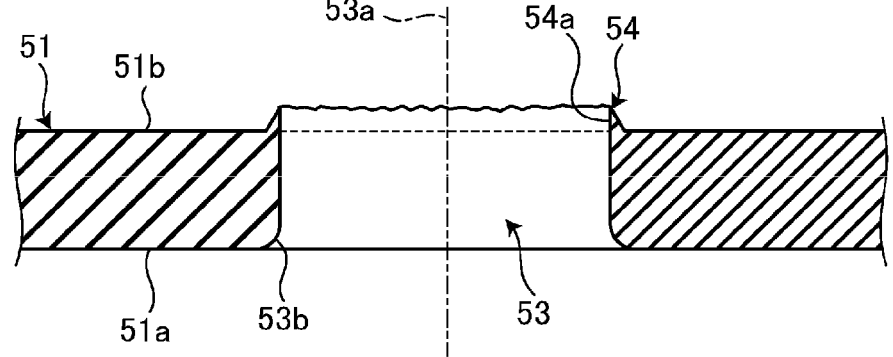
FIG. 6 is a sectional view of a first through hole.

FIG. 6 is a sectional view of the first through hole 53. An axis 53*a* of the first through hole 53 is substantially orthogonal to a plate surface of the main plate portion 51 and thus to an end surface of the secondary battery 41. An inner diameter of the first through hole 53 is 0.2 mm or more and 0.8 mm or less. An inner diameter of the first through hole 53 may be 0.5 mm or more and 0.8 mm or less. Note that it goes without saying that an inner diameter of the first through hole 53 is not limited to this value.

On the plate surface (hereinafter referred to as an opposing surface 51*a*) side of the main plate portion 51 facing an end surface of the secondary battery 41, a peripheral edge portion of the first through hole 53 has an arc shape portion 53*b* having an arc shape section. In the first lead plate 50, the opposing surface 51*a* is on the same plate surface as a plate surface having the connection surface 52*a*1.

On the other hand, a first wall portion 54 is provided on a plate surface (hereinafter referred to as an opposite surface 51*b*) on the opposite side to the opposing surface 51*a* and a plate surface having the connection surface 52*a*1 of the first lead plate 50. The first wall portion 54 is in a peripheral edge portion of the first through hole 53 and is continuous with the main plate portion 51. The first wall portion 54 extends from the opposite surface 51*b* along the axis 53*a*. The first wall portion 54 has a first wall surface 54*a* continuous with an inner peripheral surface of the first through hole 53. Note that the first wall portion 54 may extend obliquely from a peripheral edge portion of the first through hole 53 in a direction approaching the axis 53*a*. Alternatively, the first wall portion 54 may extend obliquely from a peripheral edge portion of the first through hole 53 in a direction away from the axis 53*a*.

The arc shape portion 53*b* and the first wall portion 54 are formed at the time of press working of the first lead plate 50. The first wall portion 54 is what is called a burr.

Figure 7:
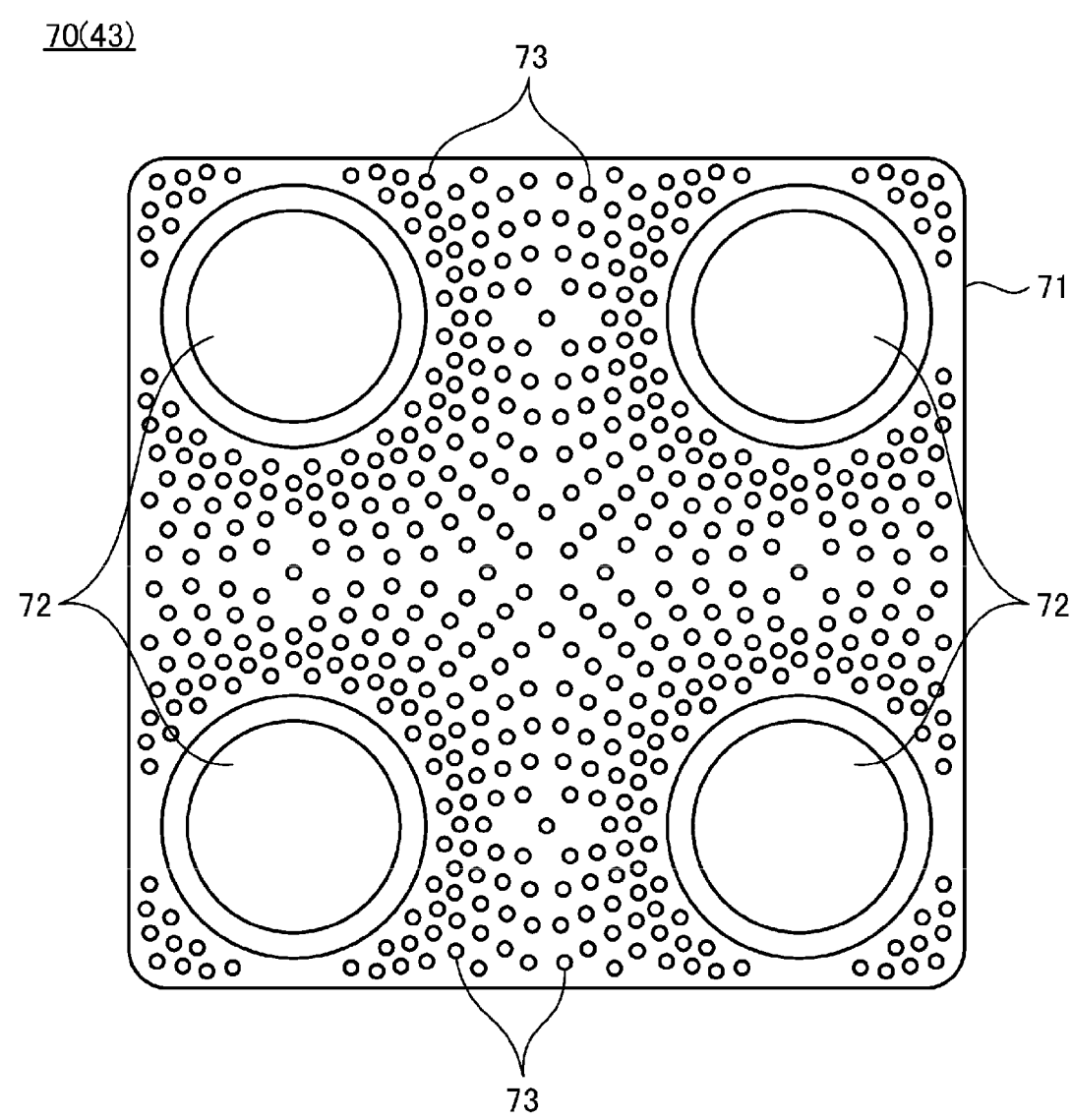
FIG. 7 is a plan view of a third lead plate.

FIG. 7 is a plan view of the third lead plate 70. The third lead plate 70 is not electrically connected to the connector 20 and does not have the connection terminal T. The third lead plate 70 includes a main plate portion 71, four recesses 72, and a plurality of first through holes 73.

The main plate portion 71 of the third lead plate 70 is formed in the same manner as the main plate portion 51 of the first lead plate 50 except that the main plate portion 71 has a square shape in a plan view. Further, four of the recesses 72 and a plurality of the first through holes 73 are formed similarly to the recesses 52 and the first through hole 53 of the first lead plate 50.

That is, a bottom surface of four of the recesses 72 are electrically connected to one of the positive electrode terminal 41*a* and the negative electrode terminal 41*b*. Each of four of the recesses 72 has a bottom wall portion 72*a* and an inclined wall portion 72*b* (FIG. 3).

Further, an inner diameter of the first through hole 73 penetrating the main plate portion 71 is 0.2 mm or more and 0.8 mm or less. Furthermore, in a plan view of the main plate portion 71, the number of the first through holes 73 per unit area increases toward the recess 72, and the first through holes 73 are radially arranged around a central portion of the recess 72.

Next, operation of the battery pack 1 when the cleavage valve 41*g* is cleaved in a case where the bottom wall portion 52*a* of the first lead plate 50 is connected to the positive electrode terminal 41*a* will be described. When the cleavage valve 41*g* is cleaved, gas and a spark are ejected from the hole 41*f*1 toward the main plate portion 51. The spark is generated from a part of, for example, current collecting foil and an electrode.

The gas is ejected toward the main plate portion 51. The first through hole 53 in the main plate portion 51 is arranged at a portion overlapping the secondary battery 41 in a plan view in which the battery unit 40 is viewed from one of the positive electrode terminal 41*a* and the negative electrode terminal 41*b*. Therefore, the gas passes through the first through hole 53 and flows out to the opposite side of the secondary battery 41 across the first lead plate 50. Therefore, it is possible to prevent the gas from flowing between the secondary battery 41 in which the cleavage valve 41*g* is cleaved and the first lead plate 50 and being blown to another one of the secondary batteries 41.

In a plan view of the main plate portion 51, the number of the first through holes 53 per unit area is larger in a location closer to the recess 52, that is, in a location closer to the secondary battery 41. That is, a larger number of the first through holes 53 are provided in a location of the first lead plate 50 where gas ejected from secondary battery 41 is likely to be blown. Therefore, the gas more easily passes through the first through hole 53. Therefore, it is possible to further prevent gas from being blown to another one of the secondary batteries 41.

Furthermore, the first through hole 53 is also arranged in a portion other than a portion overlapping the secondary battery 41 in a plan view of the battery unit 40 viewed from one of the positive electrode terminal 41*a* and the negative electrode terminal 41*b*. The gas passes through the first through hole 53 between the secondary battery 41 in which the cleavage valve 41*g* is cleaved and another one of the secondary batteries 41 in a plan view. Therefore, it is possible to further prevent gas from being blown to another one of the secondary batteries 41.

In a case where an inner diameter of the first through hole 53 is 0.5 mm or more, a flow rate of the gas flowing through the first through hole 53 increases as compared with a case where an inner diameter of the first through hole 53 is 0.2 mm or more and less than 0.5 mm. Therefore, it is possible to further prevent gas from being blown to another one of the secondary batteries 41.

Further, the first wall portion 54 is provided on the opposite surface 51*b* opposite to a plate surface having the opposing surface 51*a* facing an end surface of the secondary battery 41. Therefore, the first wall portion 54 does not prevent the gas from flowing into the first through hole 53. Therefore, it is possible to further prevent gas from being blown to another one of the secondary batteries 41. Further, since the first wall portion 54 has the first wall surface 54*a* that is on the opposite surface 51*b* and is continuous with an inner peripheral surface of the first through hole 53, the gas flowing out from the first through hole 53 is guided along the axis 53*a* (FIG. 6) substantially orthogonal to an end surface of the secondary battery 41. Therefore, it is possible to further prevent gas from being blown to another one of the secondary batteries 41.

Further, a spark ejected from the hole 41*f*1 is a particle, and its size is approximately between 0.05 mm and 1.2 mm. When a spark having size exceeding 0.8 mm hits another one of the secondary batteries 41, temperature of the secondary battery 41 and internal pressure of the secondary battery 41 may increase.

As described above, an inner diameter of the first through hole 53 is 0.8 mm or less. By the above, a spark having size exceeding 0.8 mm is caught by the first through hole 53. That is, the first through hole 53 captures a spark having size exceeding 0.8 mm. Therefore, it is possible to prevent a spark having size exceeding 0.8 mm from hitting another one of the secondary batteries 41.

Further, in a plan view of the main plate portion 51, the number of the first through holes 53 per unit area increases toward the recess 52. Therefore, the number of a plurality of the first through holes 53 in a portion of the main plate portion 51 close to the hole 41*f*1 is relatively large. Therefore, the first through hole 53 can efficiently capture a spark ejected from the cleavage valve 41*g*.

Furthermore, in a case where the first through hole 53 relatively close to the recess 52 catches a spark and is clogged, it is possible to secure the first through hole 53 that is not clogged at a portion other than a portion overlapping the secondary battery 41 in a plan view of the battery unit 40 viewed from one of the positive electrode terminal 41*a* and the negative electrode terminal 41*b*. Therefore, flow of the gas can be ensured.

Further, in a case where the bottom wall portion 52*a* of the first lead plate 50 is connected to the negative electrode terminal 41*b* and a side wall on the other end side of the can 41*d* is cleaved from the thin portion 41*h*, gas ejected from the cleaved portion is ejected toward the main plate portion 51. Also in this case, the gas passes through the first through hole 53 and flows out to the opposite side of the secondary battery 41 across the first lead plate 50. Therefore, it is possible to prevent the gas from flowing between the secondary battery 41 in which a side wall on the opposite end side of the can 41*d* is cleaved and the first lead plate 50 and being blown to another one of the secondary batteries 41.

Note that the gas passes through the first through hole 53 of the second lead plate 60 and the first through hole 73 of the third lead plate 70 similarly to the first through hole 53 of the first lead plate 50.

Next, the battery pack 1 is described according to a variation in an embodiment.

The battery pack 1 according to the variation is different in arrangement of the first through holes 53 and 73 according to an embodiment. In a plan view of the main plate portions 51 and 71, the number of the first through holes 53 and 73 per unit area is determined based on magnitude of current flowing through the main plate portions 51 and 71.

Figure 8:
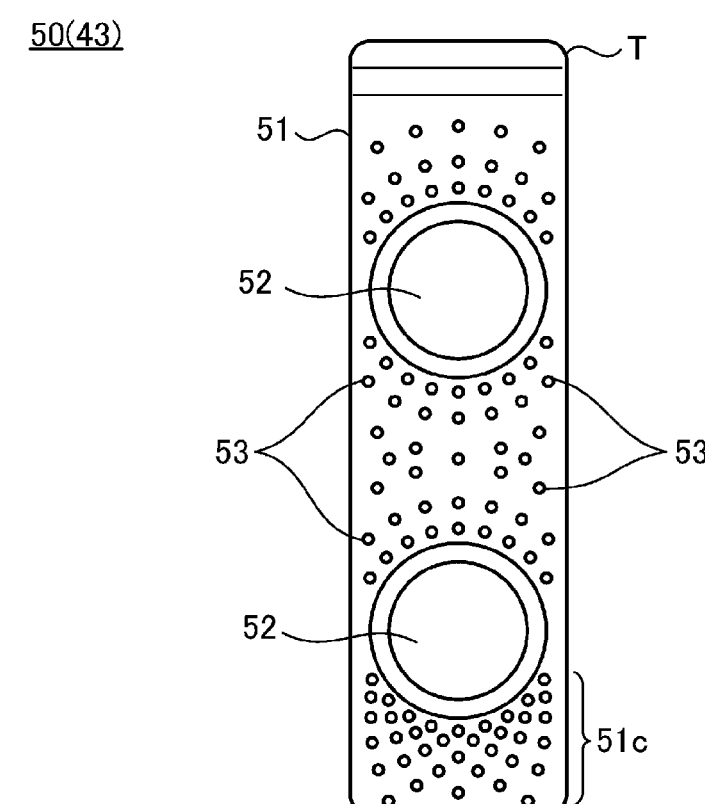
FIG. 8 is a plan view of the first lead plate according to an embodiment.

FIG. 8 is a plan view of the first lead plate 50 according to the variation. In the main plate portion 51, current flows between two of the recesses 52 and between the recess 52 and the connection terminal T. On the other hand, current does not flow through an end portion 51*c* of the main plate portion 51 on the side opposite to the connection terminal T side.

In the main plate portion 51, the number of the first through holes 53 per unit area between two of the recesses 52 and between the recess 52 and the connection terminal T is smaller than the number of the first through holes 53 per unit area of the end portion 51*c* of the main plate portion 51.

That is, the number of the first through holes 53 per unit area in a portion through which current flows is determined to be smaller than the number of the first through holes 53 per unit area in a portion through which current does not flow. By the above, the presence of the first through hole 53 can prevent increase in electric resistance and hindrance of flow of current.

Figure 9:
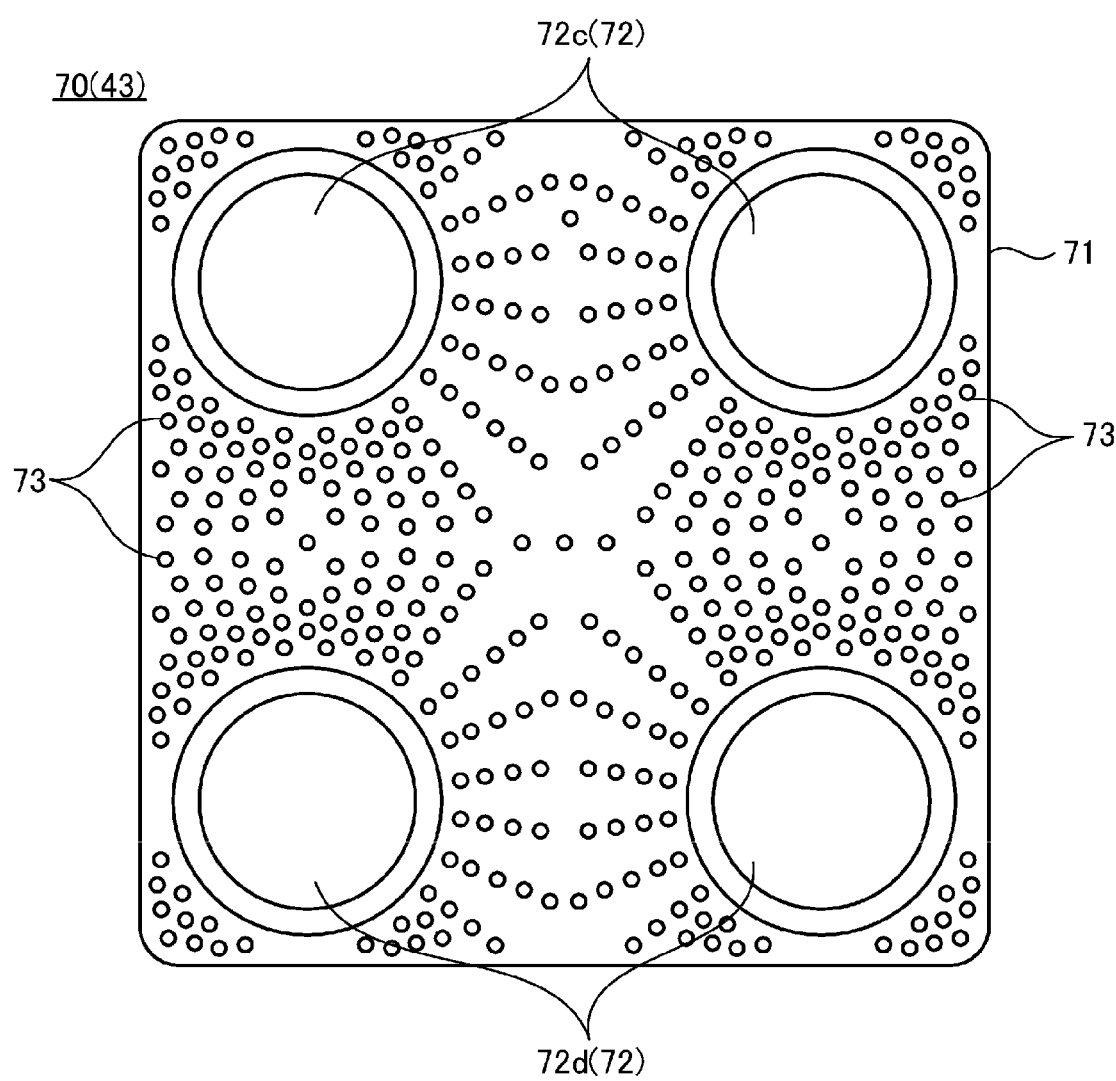
FIG. 9 is a plan view of the third lead plate according to an embodiment.

FIG. 9 is a plan view of the third lead plate 70 according to the variation. In the main plate portion 71 of the third lead plate 70, due to arrangement of the secondary battery 41, current flowing between two first recesses 72*c* and between two second recesses 72*d* is larger than current flowing between the first recess 72*c* and the second recess 72*d*. The first recess 72*c* and the second recess 72*d* are formed in the same manner as the recess 72 described above according to an embodiment.

In the main plate portion 71 of the third lead plate 70, the number of the first through holes 73 per unit area between two of the first recesses 72*c* and between two of the second recesses 72*d* is smaller than the number of the first through holes 73 per unit area between the first recess 72*c* and the second recess 72*d*. That is, the number of the first through holes 73 per unit area is determined to be larger in a portion where magnitude of current is smaller in the main plate portion 71. Accordingly, also in the third lead plate 70, the presence of the first through hole 73 can prevent increase in electric resistance and hindrance of flow of current.

Note that the first through hole 53 may be arranged in the recess 52. Further, the first through hole 53 may be arranged in the first piece 50*a* of the first lead plate 50.

Next, description will be made on the battery pack 1 according to another embodiment.

Figure 10:
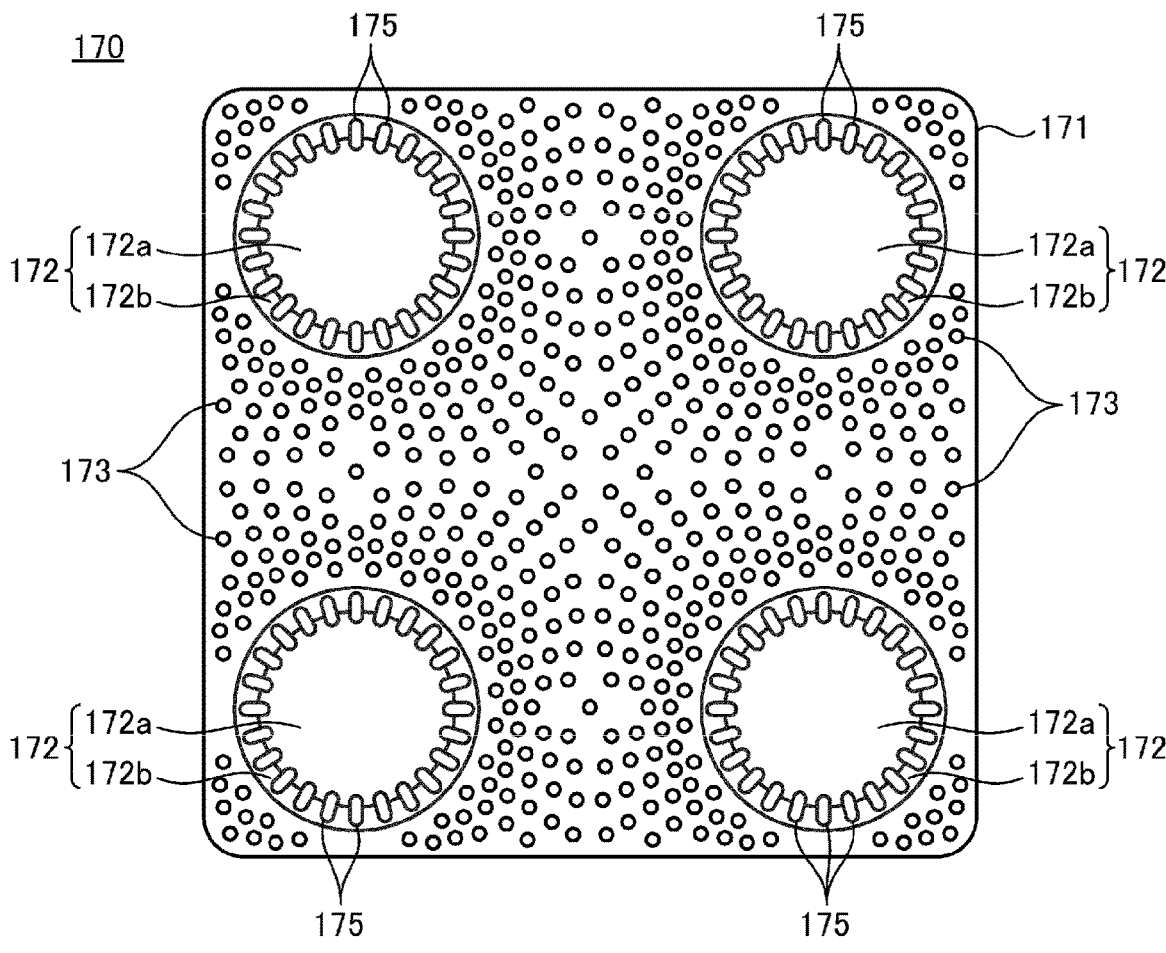
FIG. 10 is a plan view of the third lead plate according to an embodiment.

FIG. 10 is a plan view of a third lead plate 170. The third lead plate 170 according to an embodiment further includes a second through hole 175 and a second wall portion 176. Note that the third lead plate 170 has a plurality of first through holes 173 as described previously.

The second through hole 175 is in a recess 172 and penetrates an inclined wall portion 172*b* at a position away from a main plate portion 171. In a plan view, a plurality of the second through holes 175 are arranged over an entire circumference along a peripheral edge of a bottom wall portion 172*a*. As described above, a plurality of the second through holes 175 face each other with a central portion of the bottom wall portion 172*a* interposed between them in a plan view.

The second through hole 175 has an elongated hole shape in a plan view extending along a radial direction of the bottom wall portion 172*a* having a circular shape in a plan view. In a plan view, an end portion on the bottom wall portion 172*a* side of the second through hole 175 is located in the bottom wall portion 172*a*, and an end portion on the main plate portion 171 side of the second through hole 175 is located in the inclined wall portion 172*b*.

Figure 11:
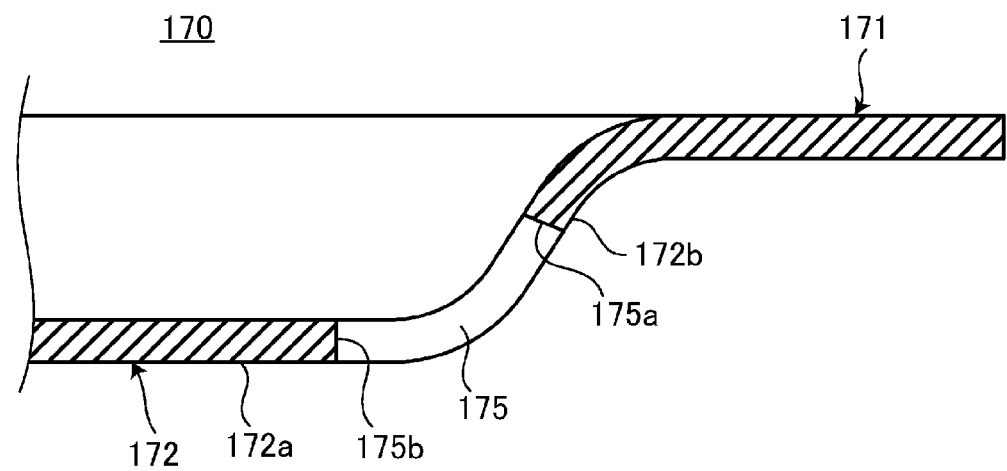
FIG. 11 is a sectional view of a second through hole taken along a plane orthogonal to a bottom surface of a recess.

FIG. 11 is a sectional view of the second through hole 175 taken along a plane orthogonal to a bottom surface of the recess 172. In a sectional view of the second through hole 175 taken along a plane orthogonal to a bottom surface, an end portion 175*a* on the main plate portion 171 side of an inner peripheral surface of the second through hole 175 is inclined toward the bottom wall portion 172*a* side. In FIG. 11, the end portion 175*a* on the main plate portion 171 side of an inner peripheral surface of the second through hole 175 extends along a thickness direction of the inclined wall portion 172*b* and is substantially orthogonal to a plate surface of the inclined wall portion 172*b*.

On the other hand, in FIG. 11, an end portion 175b on the bottom wall portion 172a side in an inner peripheral surface of the second through hole 175 extends along a thickness direction of the bottom wall portion 172a and is orthogonal to a plate surface of the bottom wall portion 172a. That is, the end portion 175a on the main plate portion 171 side of an inner peripheral surface of the second through hole 175 is inclined with respect to the end portion 175b on the bottom wall portion 172a side of an inner peripheral surface of the second through hole 175.

Further, a width of the second through hole 175 is 0.2 mm or more and 0.8 mm or less. Note that the width of the second through hole 175 may be 0.5 mm or more and 0.8 mm or less. Note that it goes without saying that the width of the second through hole 175 is not limited to this value.

The second through hole 175 is formed by press working before the recess 172 is formed. After the second through hole 175 penetrating along a thickness direction of the third lead plate 170 having a flat plate shape is formed, the recess 172 is formed, so that the end portion 175a on the main plate portion 171 side in an inner peripheral surface of the second through hole 175 is inclined toward the bottom wall portion 172a side.

Figure 12:
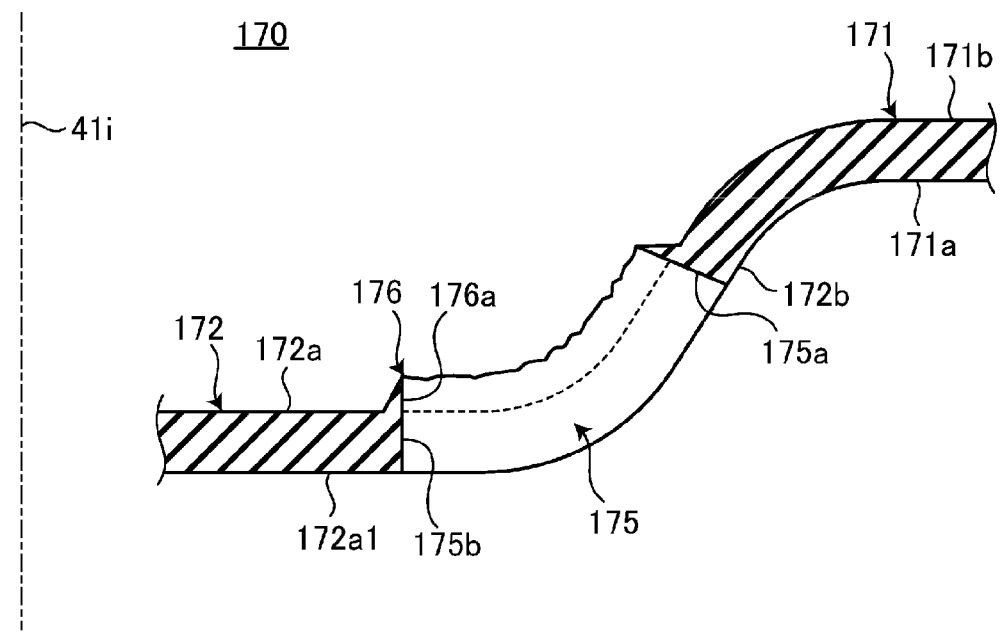
FIG. 12 is a sectional view of 12 the second through hole.

FIG. 12 is a sectional view of the second through hole 175. The second wall portion 176 is provided on an opposite surface 171b which is a plate surface opposite to a plate surface having an opposing surface 171a and a connection surface 172a1. The second wall portion 176 is in a peripheral edge portion of the second through hole 175 and is continuous with the recess 172. The second wall portion 176 on the inclined wall portion 172b extends from a peripheral edge portion of the second through hole 175 in a direction approaching an axis 41i which is a central axis of the secondary battery 41. The second wall portion 176 in the bottom wall portion 172a extends from a peripheral edge portion of the second through hole 175 along the axis 41i. Note that the second wall portion 176 in the bottom wall portion 172a may extend obliquely in a direction approaching the axis 41i from a peripheral edge portion of the second through hole 175.

The second wall portion 176 has a second wall surface 176a continuous with an inner peripheral surface of the second through hole 175. The second wall portion 176 is formed at the time of press working of the third lead plate 170. The second wall portion 176 is what is called a burr.

The second wall portion 176 is on a plate surface having the opposite surface 171b opposite to a plate surface having the opposing surface 171a facing an end surface of the secondary battery 41. Therefore, the second wall portion 176 does not prevent gas ejected from the cleavage valve 41g from flowing into the second through hole 175. Therefore, it is possible to prevent gas from being blown to another one of the secondary batteries 41.

As described above, the second through hole 175 extends from the bottom wall portion 172a to the inclined wall portion 172b along a radial direction of the bottom wall portion 172a. Furthermore, the end portion 175a on the main plate portion 171 side of an inner peripheral surface of the second through hole 175 is inclined toward the bottom wall portion 172a side. Therefore, gas that passes through the second through hole 175 flows toward a central portion of the bottom wall portion 172a in a plan view.

Further, in a plan view, a plurality of the second through holes 175 face each other with a central portion of the bottom wall portion 172a interposed between them. Therefore, gases that pass through a plurality of the second through holes 175 collide with each other at the center of the bottom wall portion 172a in a plan view, and momentum of gas in a direction along a plate surface of the third lead plate 170 decreases. Therefore, it is possible to prevent gas that passes through the second through hole 175 from being blown to another one of the secondary batteries 41.

Note that the end portion 175a on the main plate portion 171 side of an inner peripheral surface of the second through hole 175 may be substantially orthogonal to a bottom surface of the bottom wall portion 172a, and may be substantially parallel to the end portion 175b on the bottom wall portion 172a side of an inner peripheral surface of the second through hole 175 according to an embodiment. In this case, after the recess 172 is formed, the second through hole 175 is formed by press working.

Further, the second through hole 175 may have a shape extending from the bottom wall portion 172a to the main plate portion 171 according to an embodiment.

Further, the second through hole 175 may be formed only in the inclined wall portion 172b without being formed in the bottom wall portion 172a and the main plate portion 171 according to an embodiment. In this case, the end portion 175b on the bottom wall portion 172a side in an inner peripheral surface of the second through hole 175 extends along a thickness direction of the inclined wall portion 172b and is substantially orthogonal to a plate surface of the inclined wall portion 172b. That is, in this case, the end portion 175a on the main plate portion 171 side of an inner peripheral surface of the second through hole 175 is substantially parallel to the end portion 175b on the bottom wall portion 172a side of an inner peripheral surface of the second through hole 175. Further, in this case, the second through hole 175 may have a circular shape in a plan view instead of an elongated hole shape in a plan view.

Further, a plurality of the second through holes 175 may be arranged at a part of a peripheral edge of the bottom wall portion 172a as long as they are at a position where gases that pass through a plurality of the second through holes 175 collide with each other according to an embodiment. For example, two of the second through holes 175 are preferably located at positions facing each other with a central portion of the bottom wall portion 172a interposed between them in a plan view according to an embodiment.

In an embodiment, the first lead plate 50, the second lead plate 60, and the third lead plates 70 and 170 may be formed by a method other than press working such as injection molding or cutting. In this case, the first wall portion 54 and the second wall portion 176 are not burrs but side walls.

Further, the first lead plate 50 does not need to have the first wall portion 54, and the third lead plate 170 does not need to have the second wall portion 176 according to an embodiment. In this case, the first through hole 53 and the second through hole 175 are formed by laser processing, for example. Further, in this case, an inner diameter of the first through hole 53 and a width of the second through hole 175 may be less than 0.2 mm.

Further, the secondary battery 41 does not need to have the cleavage valve 41g according to an embodiment. Even in a case where gas is ejected from an end surface of the secondary battery 41, the ejected gas passes through the first through holes 53 and 73 and the second through hole 175, so that it is possible to prevent the gas from being blown to another one of the secondary batteries 41.

The battery pack of the present disclosure is described below in one or more configurations and may be a combination of suitable configurations including as described below according to an embodiment.

(1)

A battery pack including:

two or more secondary batteries having a cylindrical shape and arranged in parallel; and a lead plate that electrically connects two or more of the secondary batteries.

The lead plate includes:

a first through hole; and a first wall portion provided on a plate surface on the opposite side to a plate surface having a connection surface connected to a terminal of the secondary battery, and the first wall portion has a first wall surface continuous with an inner peripheral surface of the first through hole.

(2)

The battery pack according to (1), in which the first through hole is in a portion of the lead plate overlapping the secondary battery in a plan view as viewed from the terminal side.

(3)

The battery pack according to (1) or (2), in which the first through hole is located at a portion other than a portion of the lead plate overlapping the secondary battery in a plan view as viewed from the terminal side.

(4)

The battery pack according to any one of (1) to (3), in which the lead plate has a plurality of the first through holes, and a plurality of the first through holes are radially arranged around the terminal in a plan view as viewed from the terminal side.

(5)

The battery pack according to any one of (1) to (4), in which an inner diameter of the first through hole is 0.2 mm or more and 0.8 mm or less.

(6)

The battery pack according to any one of (1) to (5), in which the lead plate includes a main plate portion having a flat plate shape and a recess recessed toward the terminal side, and the recess includes:

a bottom wall portion having the connection surface on a bottom surface;

an inclined wall portion connecting the bottom wall portion and the main plate portion and having an end on the main plate portion side positioned on the outer side than an end on the bottom wall portion side in a plan view as viewed from the terminal side; and a second through hole penetrating the inclined wall portion at a position away from the main plate portion.

(7)

The battery pack according to (6), in which an end portion on the main plate portion side of an inner peripheral surface of the second through hole is inclined toward the bottom wall portion side in a sectional view of the second through hole taken along a plane orthogonal to the bottom surface.

(8)

The battery pack according to (6) or (7), in which the recess further includes a second wall portion provided on a plate surface on the opposite side to a plate surface having the connection surface, and the second wall portion has a second wall surface continuous with an inner peripheral surface of the second through hole.

Note that the embodiments described herein are intended to facilitate understanding of the present disclosure, but not intended to construe the present disclosure in any limited way.

It should be appreciated that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A battery pack comprising:

two or more secondary batteries having a cylindrical shape and arranged in parallel; and a lead plate that electrically connects two or more of the secondary batteries, wherein the lead plate includes:

a first through hole; and a first wall portion provided on a plate surface on a first plate surface side opposite to a second plate surface side having a connection surface connected to a terminal of the secondary battery, and the first wall portion has a first wall surface continuous with an inner peripheral surface of the first through hole, wherein the first wall portion extends from the first plate surface side along an axis of the first through hole.

2. The battery pack according to claim 1, wherein the first through hole is in a portion of the lead plate overlapping the secondary battery in a plan view as viewed from the terminal side.

3. The battery pack according to claim 2, wherein the first through hole is further located at a portion other than a portion of the lead plate overlapping the secondary battery in a plan view as viewed from the terminal side.

4. The battery pack according to claim 1, wherein the lead plate has a plurality of first through holes, and the plurality of first through holes are radially arranged around the terminal in a plan view as viewed from the terminal side.

5. The battery pack according to claim 1, wherein an inner diameter of the first through hole is 0.2 mm or more and 0.8 mm or less.

6. The battery pack according to claim 1, wherein the lead plate includes a main plate portion having a flat plate shape and a recess recessed toward the terminal side, and the recess includes:

a bottom wall portion having the connection surface on a bottom surface;

an inclined wall portion connecting the bottom wall portion and the main plate portion and having an end on the main plate portion side positioned on an outer side than an end on the bottom wall portion side in a plan view as viewed from the terminal side; and a second through hole penetrating the inclined wall portion at a position away from the main plate portion.

7. The battery pack according to claim 6, wherein an end portion on the main plate portion side of an inner peripheral surface of the second through hole is inclined toward the bottom wall portion side in a sectional view of the second through hole taken along a plane orthogonal to the bottom surface.

8. The battery pack according to claim 6, wherein the recess further includes a second wall portion provided on a plate surface on an opposite side to a plate surface having the connection surface, and the second wall portion has a second wall surface continuous with an inner peripheral surface of the second through hole.

9. A battery pack comprising:

two or more secondary batteries having a cylindrical shape and arranged in parallel; and a lead plate that electrically connects two or more of the secondary batteries, wherein the lead plate includes:

a first through hole; and a first wall portion provided on a plate surface on a first plate surface side opposite to a second plate surface side having a connection surface connected to a terminal of the secondary battery, and the first wall portion has a first wall surface continuous with an inner peripheral surface of the first through hole, wherein the lead plate has a plurality of first through holes, and the plurality of first through holes are radially arranged around the terminal in a plan view as viewed from the terminal side.

10. A battery pack comprising:

two or more secondary batteries having a cylindrical shape and arranged in parallel; and a lead plate that electrically connects two or more of the secondary batteries, wherein the lead plate includes:

a first through hole; and a first wall portion provided on a plate surface on a first plate surface side opposite to a second plate surface side having a connection surface connected to a terminal of the secondary battery, and the first wall portion has a first wall surface continuous with an inner peripheral surface of the first through hole, wherein the lead plate includes a main plate portion having a flat plate shape and a recess recessed toward the terminal side, and the recess includes:

a bottom wall portion having the connection surface on a bottom surface;

an inclined wall portion connecting the bottom wall portion and the main plate portion and having an end on the main plate portion side positioned on an outer side than an end on the bottom wall portion side in a plan view as viewed from the terminal side; and a second through hole penetrating the inclined wall portion at a position away from the main plate portion.

11. The battery pack according to claim 10, wherein an end portion on the main plate portion side of an inner peripheral surface of the second through hole is inclined toward the bottom wall portion side in a sectional view of the second through hole taken along a plane orthogonal to the bottom surface.

12. The battery pack according to claim 10, wherein the recess further includes a second wall portion provided on a plate surface on an opposite side to a plate surface having the connection surface, and the second wall portion has a second wall surface continuous with an inner peripheral surface of the second through hole.

\* \* \* \* \*